(12) United States Patent
Edwards

(10) Patent No.: US 8,864,854 B2
(45) Date of Patent: *Oct. 21, 2014

(54) PELLETIZATION AND CALCINATION OF GREEN COKE USING AN ORGANIC BINDER

(75) Inventor: Leslie C. Edwards, Kingwood, TX (US)

(73) Assignee: Rain CII Carbon LLC, Kingwood, TX (US)

( * ) Notice: Subject to any disclaimer, the term of this patent is extended or adjusted under 35 U.S.C. 154(b) by 303 days.

This patent is subject to a terminal disclaimer.

(21) Appl. No.: 13/180,765

(22) Filed: Jul. 12, 2011

(65) Prior Publication Data

US 2012/0210635 A1     Aug. 23, 2012

Related U.S. Application Data

(63) Continuation-in-part of application No. 13/033,110, filed on Feb. 23, 2011.

(51) Int. Cl.
*C10L 5/40* (2006.01)
*C10L 9/08* (2006.01)
*C10L 5/36* (2006.01)
*C10L 5/04* (2006.01)
*C10L 5/14* (2006.01)

(52) U.S. Cl.
CPC . *C10L 9/08* (2013.01); *C10L 5/363* (2013.01); *C10L 5/04* (2013.01); *C10L 5/14* (2013.01); *C10L 5/143* (2013.01)

USPC .................... 44/589; 44/599; 44/605; 44/607

(58) Field of Classification Search
USPC ..................... 44/589, 599, 605, 607
See application file for complete search history.

(56) References Cited

U.S. PATENT DOCUMENTS

| | | | |
|---|---|---|---|
| 3,966,560 A | 6/1976 | Farago et al. | |
| 4,039,319 A * | 8/1977 | Schapiro et al. | ............... 75/766 |
| 4,369,171 A | 1/1983 | Grindstaff et al. | |
| 4,388,152 A | 6/1983 | Wasson et al. | |
| 4,786,438 A | 11/1988 | Blackmore | |
| 2006/0239889 A1 | 10/2006 | Lewis et al. | |

FOREIGN PATENT DOCUMENTS

DE     10 2009 015 027 A1     8/2011

* cited by examiner

*Primary Examiner* — Cephia D Toomer
(74) *Attorney, Agent, or Firm* — Hackler Daghighian & Martino

(57) ABSTRACT

A method of calcining green petroleum coke which includes separating the green coke having a particle size of between 0.1 mm and 50 mm into undersized and oversized fractions, pelletizing the undersized fraction with a binder to form pelletized coke, combining the oversized fraction and the pelletized coke to form a feed mixture, and calcining the feed mixture to form calcined coke. The method includes the addition of a pulverization step wherein all the green coke is pulverized before pelletization and the pellets are then calcined to produce a pelletized calcined coke product.

19 Claims, 2 Drawing Sheets

PELLETIZATION AND CALCINATION OF GREEN COKE USING AN ORGANIC BINDER

The present application is a continuation-in-part of U.S. Ser. No. 13/033,110 filed Feb. 23, 2011. This application is to be incorporated herewith in its entirety.

The present invention is directed to a method for calcining green petroleum coke and more particularly for calcining green petroleum coke utilizing a shaft calciner which will reduce product dusting problems or with a rotary kiln calciner to significantly improve recovery and produce a more consistent and homogeneous product.

The value of green petroleum coke used to produce calcined petroleum coke for use in the aluminum industry and other industries which use calcined petroleum coke has been growing. This is being driven by increased demand from these growing end-user industries and a diminishing supply of suitable quality green petroleum coke from the oil refining industry. The total global production of green petroleum coke has been increasing but much of the new, incremental production is lower in quality with higher contaminant levels such as sulfur, vanadium and nickel. Calcined petroleum used by the aluminum industry and other industries requires higher quality green petroleum coke with lower contaminant levels and a favorable structure for the end-use application.

As the value of green petroleum coke suitable for calcining increases due to global supply/demand imbalances, it becomes more feasible and desirable to add additional processing steps which can further enhance the value of the green petroleum coke and the calcined coke product. The additional cost of adding such processing steps can be justified if it allows a broader range of green petroleum cokes to be used or improves the quality of the calcined coke product or improves the recovery of calcined coke in the transition from green petroleum coke to calcined petroleum coke or all of the above. The addition of processing steps such as screening, grinding and pelletization/agglomeration or briquetting are all examples of things that can be done to enhance the overall value or improve the utility value of the calcined coke product produced. It is the addition of these extra processing steps that form the basis of this invention and patent application The present invention therefore utilizes a combination of pelletization, agglomeration or briquetting technologies in combination with screening and milling/grinding technologies to eliminate dusting problems in shaft calcining. A combination of this technology can also significantly improve the ability to use a wider range of green petroleum coke raw materials to make calcined petroleum coke and significantly improve calcined coke quality by making more dense pellets or briquettes or improve the recovery of calcined coke from the green coke starting product in rotary kiln calcining technology.

SUMMARY OF THE INVENTION

A method in accordance with the present invention for calcining green petroleum coke includes separating green coke having a particle size between about 0.1 mm and 75 mm into undersized and oversized fractions. More particularly, the undersized fractions may have a particle size of less than 4 Tyler mesh (4.75 mm) and the oversized fraction may have a particle size of greater than 4.75 mm. These particle sizes are given as an example only. Any particle size could be chosen as the delineation point between the undersize and over-size coke fractions.

Thereafter, the undersized fraction is pelletized with a binder to form pelletized coke or briquetted to form briquettes. Pelletization is considered preferable because it generally requires less energy and produces spherical shaped pellets which can be advantageous in end use applications such as production of carbon anodes used in aluminum smelting. Grinding or milling of the undersize coke may also be desirable and/or necessary to better control pellet formation, size and strength.

More particularly, the binder may include any common water soluble and low cost binders such as starch, sugar, lignosulphonate, PVA (polyvinyl alcohol), CMC (carboxy methyl cellulose) and hemicellulose. Coal tar pitch with a softening point of 90-130° may also be used as a binder. In this case, the coal tar pitch and the undersize coke fractions must be heated In principal, any binding agent commonly used in other pelletizing and briquetting processes can be used including petroleum pitch. The only constraint is that the binder must be largely organic based with either no or very low concentrations of inorganic elements like sodium, calcium or potassium. Cost is also a very important consideration and it is preferable to use low cost binders.

Thereafter, the oversized fraction and the pelletized coke or briquetted coke are combined to form a feed mixture, which is thereafter calcined in a shaft calciner or a rotary kiln calciner.

The binder may be utilized in an amount of between about 0 to about 15% by weight of the pellet or briquette.

Alternatively, a method in accordance with the present invention may also include milling green petroleum coke to a particle size of <2 mm and thereafter pelletizing or briquetting the milled coke with a binder to form pelletized or briquetted coke. The particle size of 2 mm is given as an example only. It may be advantageous to mill to a finer or coarser particle size. In some industries like cement production, petroleum coke is milled to a very fine particle size, typically 95%-200 mesh (−75 microns or −75 μm). The advantage of milling the coke to a finer particle size is that it allows better control of the pelletization process and formation of more uniform, more dense and higher green strength pellets.

Preferably, the pellet size is between about 1 mm and 25 mm.

BRIEF DESCRIPTION OF THE DRAWINGS

The advantages and features of the present invention will be better understood by the following description when considered in conjunction with the accompanying drawings in which.

DETAILED DESCRIPTION

Figure 1:
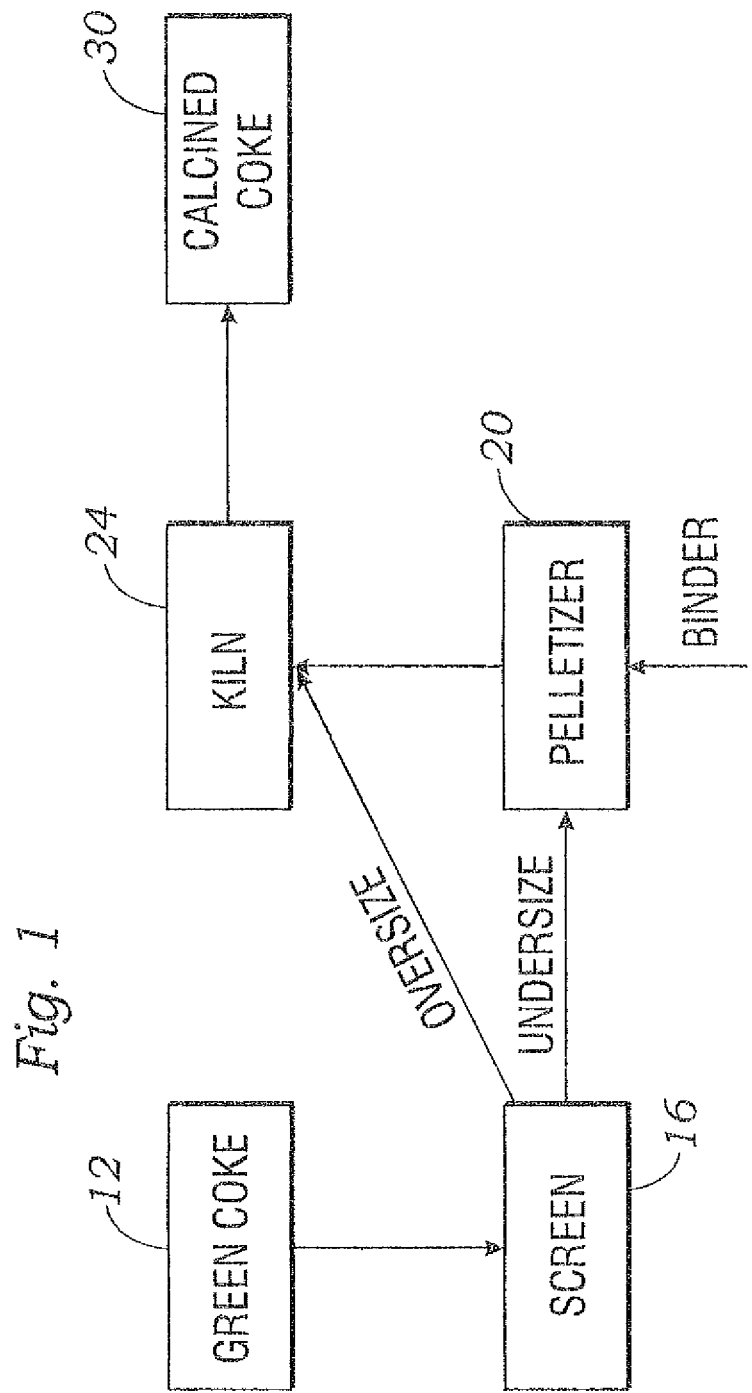
FIG. 1 is a block diagram of an embodiment of the present invention utilizing a screen for separating green coke before pelletization and calcining.

Rotary kilns and shaft kilns have been used successfully for many years to produce calcined coke which is the primary raw material for making carbon anodes used in the electrolytic production of aluminum.

The primary goals of calcining green coke are to:
1. Remove volatile matter (VM);
2. Densify the structure to avoid shrinkage of coke during anode baking; and
3. Transform the structure into an electrically conductive form of carbon.

Rotary kilns, are large diameter, sloped refractory lined steel-shelled cylinders which rotate during operation. Green coke is fed continuously in one end and calcined coke is discharged from the other end at 1200-1300° C. The coke bed loading in the kiln is low (7-10% of the cross-sectional area) and heat is transferred to the coke bed predominantly by radiative and convective heat transfer from the counter-current gas stream and refractory lining. 40-50% of the VM is combusted inside the kiln and the rest is combusted in the pyroscrubber upstream of the kiln. The VM combusted in the kiln provides most of the heat for calcination but natural gas, fuel oil and/or pure oxygen can be added to provide additional heat.

In a rotary kiln, approximately 10% of the finest particle size green coke becomes entrained in the flue gas stream and blows out the back end or feed-end of the kiln. From there, it travels to a pyroscrubber and is combusted completely producing a large volume of waste-heat. This waste heat is typically recovered in the form of waste-heat energy. As a result of VM loss and coke fines loss, the typical recovery of calcined coke in a rotary kiln is around 77-80%. In other words, for every 1 ton of dry green coke fed to the kiln, 0.77-0.80 tons of calcined coke product is produced.

A shaft kiln, or calciner, has multiple vertical refractory shafts surrounded by flue walls. The green coke is fed into the top and travels down through the shafts and exits through a water cooled jacket at the bottom. The movement of coke is controlled by opening a slide gate or rotary valve at the bottom of each shaft to discharge a small amount of cake. The discharge is intermittent (~every 20 minutes) and green coke is added to the top to maintain the feed.

The VM in a shaft furnace travels up through the coke bed and enters flue wall cavities at the top of the furnace. It is mixed with air at this point and then drawn down through a set of horizontally oriented flues. VM is combusted inside the flue walls and heat is conducted to the coke indirectly from the flue walls in an analogous manner to heat transfer in an anode bake furnace.

There is no large volume, counter-current gas flow inside a shaft calciner so there is very little loss of fine particle size green coke. As a result, the recovery in a shaft calciner is much higher than a rotary kiln, typically around 85-89%. So for every 1 ton of dry green coke fed to a shaft calciner, 0.85-0.89 tons of calcined coke product is produced. Unfortunately, the very fine particle size green coke fed to the furnace stays with the product after calcination and creates dusting problems. Once the calcined coke product is handled, the fine calcined coke particles attached to the surface of larger particles are dislodged and they create dusting problems for the end-user of the product.

The dusting problem created by shaft calciners coke can be solved by the present invention by eliminating fine green coke introduced into the kiln.

With reference to FIG. 1 a source of green petroleum coke 12 with a range of particle sizes from ~>0.1 mm to <75 mm is first separated into two size ranges using industrial scale, particle size separation equipment such as vibrating screen decks 16.

The two size ranges can be referred to as "undersize" and "oversize" fractions or "fines" and "coarse" fractions. In this example, the coke is sized at a particle size of 4.75 mm (4 Tyler mesh) so that all the −4.75 mm particle size petroleum coke is separated from the bulk petroleum coke using a series of mechanical, vibrating screens. When the particle size separation is completed, the coke will be separated into two different particle size range piles. The −4.75 mm pile is hereafter referred to as the undersize fraction and the +4.75 mm pile is hereafter referred to as the oversize fraction.

Green petroleum coke from the undersize pile is fed to an industrial scale pelletizing or agglomerating machine 20. There are many different types of pelletizing and agglomerating equipment available and the present invention covers the application of all such equipment including briquetting machines (not shown). The basic concept of the present invention is to take green petroleum coke fines or calcined petroleum coke fines and build larger particles through the application of pelletizing, agglomeration or briquetting technology.

In this first embodiment, a rotary drum pelletizer or granulator 20 of the type made by the Eirich Company is used to make spherical pellets of green petroleum coke fines. The moisture content of the petroleum coke fines is measured first and then the fines are fed to the pelletizer. A small amount of binder in the weight range of 0-15% is then added to the pelletizer and mixed with the coke fines to impart sufficient strength to the spherical pellets formed inside the pelletizer.

In this embodiment, a low cost, water soluble organic binder like sugar, starch, lignosulphonate or hemicellulose is used. This eliminates the need to dry the green coke which would be required if binders like coal tar pitch or petroleum pitch are used. A binder addition rate of <5 weight % is ideal and preferably 1% or lower. Spherical pellets are formed inside the pelletizer and the process is conducted on a batch or continuous basis. The pellets range in size from 1 mm up to 25 mm. They are either continuously discharged from the mixer or discharged at the completion of a batch. The pellets can then be used directly in the calcining process in their "green" form or fed to a fluidized bed drier and dried to increase their green strength before further handling.

The green pellets can be fed directly to a coke calcining kiln 24 (rotary or shaft) or blended with the oversize coke particles and then fed to the calcining furnace to produce calcined coke 30. Any coke calcining furnace or kiln 24 can be used including a shaft calciner, rotary kiln calciner or a rotary hearth calciner. The application of this technology works very well with a shaft calciner since a shaft calciner has no moving parts and therefore does not damage or disrupt the green coke pellets. The aim of the present invention is to make dense, low porosity calcined coke pellets and the most important step in this process is to make dense, green pellets.

When a shaft calciner is used to calcine green petroleum coke, the average volatile matter content of the green coke fed to the furnace must be controlled within a narrow range (a typical range is 10-11%) to avoid operational problems with the furnace. This same strategy must be adopted when feeding green petroleum coke pellets. The average volatile matter content of the feed mixture containing green coke pellets, oversize coke and even calcined coke must be controlled to the target volatile matter content. When high volatile matter cokes are used in the green coke blend fed to the furnace, varying amounts of calcined coke are added to the feed mix to reduce the average volatile matter content of the feed.

When the green pellets produced by this invention are fed to a rotary kiln, they significantly increase the recovery or yield of calcined coke. Fine particle size green coke is no longer "lost" from the product but is recovered in the form of high density, calcined coke pellets. This substantially improves the overall economics of the calcining process by recovering high value green coke as calcined coke product.

When green petroleum coke is separated into an undersize and oversize fraction as described above, pelletized and then calcined, the calcined coke pellets are both dense and mechanically strong and this makes them ideal for use in the production of anodes used for the electrolytic production of aluminum. The spherical shape of the pellets improves the packing density of calcined coke particles used to make an anode and this in turn helps improve anode density.

The pelletization of the green coke fines eliminates one of the main disadvantages of shaft calcining which is production of a dusty, calcined coke product. This is problematic with a shaft calciner because there is no mechanism to remove fine green coke inside the shaft calciner. All the fine green coke in the feed to the furnace ends up as fine dust in the calcined coke product. This is quite different to a rotary kiln where most of the fine particle size green coke becomes entrained in the flue gas stream and exits the kiln counter-current to the green coke feed. The entrained coke fines are then combusted in a pyro-scrubber or incinerator downstream of the kiln. In many modern plants, the waste heat generated through this combustion is recovered in the form of energy. In a shaft calciner, there is no high volume, high velocity counter-current gas flow to entrain coke fines so they stay with the product loosely agglomerated or attached to the surface of larger calcined coke particles.

The embodiment above represents one quite specific application of the present invention. The concept of using pelletization or any other form of agglomerating or briquetting green coke fines to make large pellets can be applied to any type of green petroleum coke with any chemical and physical composition. The calcined coke pellets produced during the calcination step can then be used in any application including, but not limited to, anode and aluminum production, titanium dioxide production, carbon raiser applications in metallurgical foundries, graphite electrode manufacture etc. Basically, any existing application which uses calcined petroleum coke could benefit from the present invention.

In an analogous manner to the above, any type of binding agent can be used to impart sufficient mechanical strength to the pellets or briquettes. Water soluble organic binders such as starch, sugar, CMC and PVA are given as examples but it could be any organic based binder including coal tar pitch or petroleum pitch. Inorganic binders containing elements such as sodium, calcium or silicon are not suitable because they will contaminate the calcined coke product making it unsuitable use.

Figure 2:
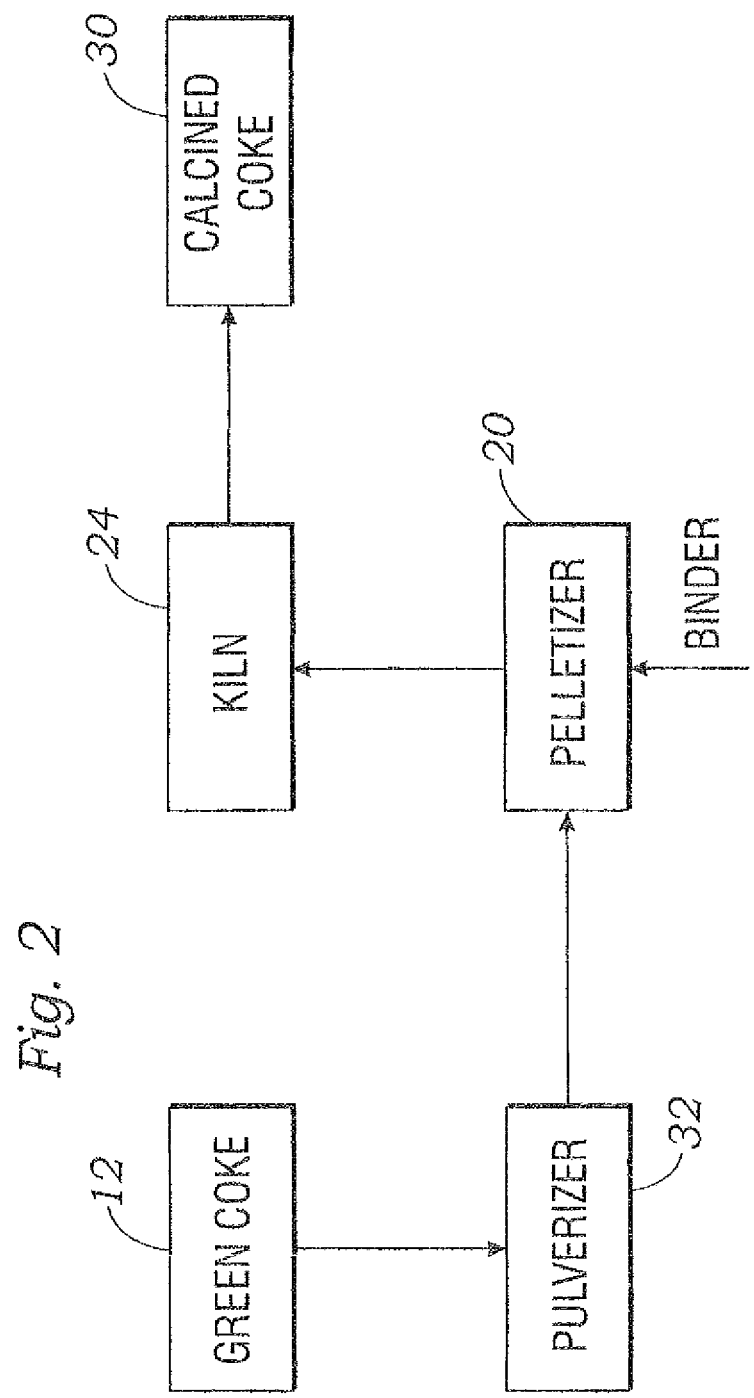
FIG. 2 is a block diagram of another embodiment of the present invention utilizing a pulverizer before preparation of green coke before pelletization and calcination thereof.

A second embodiment of the present invention is illustrated in FIG. 2 with common steps being identified by common reference numbers shown in FIG. 1. In this second embodiment, an additional process step is added whereby all the green petroleum coke is first ground or milled to produce a fine particle size product. A wide range of industrial scale crushing and milling/grinding equipment 32 can be used to pulverize the green petroleum coke to a finer particle size. There are several potential advantages to adding this pulverizing step before pelletizing the green petroleum coke fines as follows:

1) It ensures a more consistent particle size feed to the pelletizing equipment. This will ultimately lead to better control of pellet size, density and mechanical strength.
2) It provides a well-controlled way to mix and blend together green petroleum cokes with different properties. This could include cokes with different chemical, physical and structural properties.
3) It provides an excellent means for controlling the average volatile matter content of the pelletized product through the addition of small amounts of calcined coke.

The addition of a pulverizing step prior to pelletization of green petroleum coke fines may dramatically change the way green petroleum coke is used to make calcined petroleum coke. Coarse particle size green petroleum coke which is typically beneficial and desirable for calcination would no longer be important. It would also significantly improve the ability to use a wide range of green petroleum cokes to make calcined coke product with a specific and desirable set of properties. For example, the aluminum industry typically prefers to use green petroleum coke with a sponge structure to make anodes. Petroleum coke with a shot structure is less desirable due to generally higher impurity levels, a harder, more abrasion resistant isotropic structure and a higher coefficient of thermal expansion.

If all the green coke is pulverized first, cokes with a wide range of properties can be blended together to produce green petroleum coke pellets which can then be calcined to produce a consistent quality, pelletized calcined coke product with good bulk and apparent density and targeted chemical and thermal expansion properties. For example, a mixture of shot coke and sponge coke could be pelletized to produce a calcined coke product with more desirable thermal expansion properties than a mixture containing 100% shot coke. The second example therefore seeks to broaden the application of pelletization and briquetting technology to something with much greater product potential. It will provide the industry with a much more flexible technology package for utilizing different quality green petroleum cokes to produce a consistent quality calcined coke with the properties desired by the end user.

Alternatively, the method may also include milling or pulverizing the undersized fraction to give a finer partial size more suitable for pelletizing or briquetting before pelletizing same. The milling can be done in something as simple as a hammer mill to reduce the size to –2 mm. Alternatively, it can be pulverized to a very firm particle size in a vertical roller mill. Such additional milling, or pulverizing, produces fine particle size green coke such that 95% passes a 200 mesh (or 75 micron) screen.

After milling, or pulverizing, different coke sources can be blended together to produce a "customized" feedstock for pelletization. This will allow the composition and properties of the pellets or briquettes to be well controlled. This may be very advantageous when incorporating cokes such as bicoke, coal derived coke, or lower quality fuel grade cokes like shot coke.

Experimental Results

To illustrate the application and potential of this invention, the following experimental example is given. A regular, green delayed sponge coke (Conoco Phillips Alliance coke) with a sulfur content of ~1.55% was selected for the experiment. A front-end loader bucket of the coke was taken from a large pile of Alliance green coke and transferred to a 55 gallon drum. The coke in this drum was fed to a laboratory scale hammer mill and pulverized so that 95% of the product was –2.0 mm. The pulverized coke was sent to the Eirich company in Hardheim, Germany for pelletization trials in a lab scale mixer/pelletizer.

Multiple experiments were performed with this coke as follows. 3 kg batches of coke were added to the RV02E mixer and mixed for several minutes before adding a solution of various water soluble binders. In the first 4 experiments (labeled V1-V4) the binder was added in this form at levels ranging from 0.1-4 weight % of the green petroleum coke. The binder solution was added slowly while operating the pelletizing equipment. Once a sufficient amount of the binder solution was added, pellets started to form in the mixer/pelletizer. The process was stopped when the pellets looked dense and uniform. After this the pellets were dried in a stream of hot air. Several different binders were tested at different levels as summarized in Table 1.

TABLE 1

Pelletization Experiments and Binders

| Trial | Weight Coke (g) | Binder weight (g) and solution | Binder weight % |
|---|---|---|---|
| V1 | 9000 | 278 g of 5% CMC solution | 0.15 |
| V2 | 3000 | 100 g of 20% PVA solution | 0.67 |
| V3 | 3000 | 111 g of 5% CMC solution | 0.19 |
| V4 | 3000 | 266 g of 46% Molasses solution | 4.08 |
| V5 | 3000 | 130 g of Ca-lignosuphonate + 46 g H2O | 4.3 |
| V6 | 3000 | 130 g of Moviol + 180 g H2O | 4.3 |
| V7 | 3000 | 130 g CMC + 117 g H2O | 4.3 |
| V8 | 3000 | 130 Dextrin + 70 g H2O | 4.3 |
| V9 | 3000 | 1200 g coal tar pitch | 40 |

In the second set of tests (V5-V8) the binder was added to the coke in a solid form and the coke and binder were mixed first before water was sprayed into the mix to initiate the pelletization process. This second set of experiments produced good quality dense and strong pellets just like the first set of experiments.

In the last experiment, solid coal tar pitch was added as a binder. The softening point of the coal tar pitch was around 140° C. The mixture of coke and coal tar pitch had to be heated to a temperature of 150° C. to melt the pitch so that pellets could form. It took some time to heat the mixture because the coke sample contained ~13% moisture which had to driven off first at 100° C. before the pitch would melt. A much higher binder content (~40%) had to be used with coal tar pitch to allow a low enough viscosity for pelletization.

At the completion of the above experiments, the bulk density of the dry green pellets was measured and each was calcined on a batch basis in a laboratory muffle furnace capable of heating coke at a rate of 30° C./min to a temperature of 1400° C. The samples were held at the final temperature for 15 minutes. They were then cooled and the bulk density and other properties were measured. Results available at the time of writing this patent are shown in Table 2.

TABLE 2

Calcined Coke Properties

| Sample ID | Lc (A) | Real Density (g/cc) | KVBD (g/cc) |
|---|---|---|---|
| V2 | 29.2 | 2.062 | 0.912 |
| V3 | 29.3 | 2.065 | 1.045 |
| V4 | 28.4 | 2.060 | 0.982 |
| V5 | 30.9 | 2.072 | 1.005 |
| V6 | 31.3 | 2.070 | 0.946 |
| V7 | 32.3 | 2.076 | 0.840 |
| V8 | 30.0 | 2.070 | 1.033 |
| Alliance | 31.0 | 2.072 | 0.770 |
| Motiva | 30.0 | 2.070 | 0.780 |

For comparison purposes, results for 2 regular delayed sponge coke samples are included (Alliance and Motiva coke). One of these is Alliance coke calcined in a regular manner in a rotary kiln. The significantly higher bulk density (as measured by KVBD) of the pelletized coke samples is very apparent. This is a major advantage when using the coke in applications such as carbon anode production. All the pelletized samples V1-V8 caclined very well in the lab scale furnace with no problems. The only pellets that did not calcine well were the pellets made with the coal tar pitch binder. This is because the binder content was too high and the coal tar pitch did not handle the relatively high heating rate inside the furnace very well.

A scanning electron microscope (SEM) image of the pelletized calcined coke particles shows that the particles are very dense both externally and internally and very uniform in composition and structure. This is quite different to non-pelletized sponge coke particles which are more irregular in shape and composition and higher in porosity. The more homogenous structure could be very advantageous for making a more uniform calcined coke product with improved coke properties.

Although there has been hereinabove described a specific pelletization and calcination of green coke using an organic binder in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A method of calcining green petroleum coke, said method comprising:
   separating green coke having a particle size of between 0.1 mm and 75 mm into undersized and oversized fractions, where the undersized fraction comprises a particle size of less than about 4.75 mm and the oversized fraction comprises a particle size of more than about 4.75 mm;
   providing an organic based binder to the undersized fraction;
   pelletizing the undersized fraction with the binder to form pelletized coke, the binder being at a concentration providing sufficient strength to enable mechanical handling the pelletized coke after production;
   combining the oversized fraction and the pelletized coke to form a feed mixture; and
   calcining the feed mixture to form calcined coke.

2. The method according to claim 1 wherein calcining the feed mixture includes using a shaft, rotary or rotary hearth, kiln.

3. The method according to claim 1 wherein the binder is present in an amount less than 15% by weight of the undersized fraction.

4. The method according to claim 1 wherein the binder is selected from a group consisting of starch, sugar, carboxyl methyl cellulose, polyvinyl alcohol, lignosulphonate, or hemicellulose.

5. The method according to claim 4 wherein pelletizing the undersized fraction includes producing pellets with a pellet size of between about 1 mm to 25 mm.

6. The method according to claim 1 further comprising milling or pulverizing the undersized fraction before providing the organic based binder and pelletizing.

7. The method according to claim 6 wherein the milled or pulverized undersized fraction has a particle size of <2 mm.

8. A method of calcining green petroleum coke, said method comprising:
   milling green coke to a particle size of wherein 95% is less than 75 microns;
   pelletizing the milled coke with an organic base binder to form pelletized coke, wherein the organic base binder is present in an amount less than 5% by weight of the milled coke; and
   calcining the milled coke to form calcined coke.

9. The method according to claim 8 wherein calcining includes using a shaft, rotary or rotary hearth, kiln.

10. The method according to claim 8 wherein pelleting the milled coke includes the binder present in an amount providing sufficient strength to enable mechanical handling of the pelletized coke.

11. The method according to claim 10 wherein the binder is a water soluble organic binder.

12. The method according to claim 11 wherein pelletizing the milled coke includes producing pellets with a pellet size of between about 1 mm to 25 mm.

13. A method of calcining green petroleum coke, said method comprising:
separating green coke having a particle size of between 0.1 mm and 75 mm into undersized and oversized fractions, where the undersized fraction comprises a particle size of less than about 4.75 mm and the oversized fraction comprises a particle size of more than about 4.75 mm;
providing an organic binder to the undersized fraction;
briquetting the undersized fraction with the binder to form briquetted coke, the binder being present at a concentration providing sufficient strength to enable mechanical handling the briquetted coke after production;
combining the oversized fraction and the briquetted coke to form a feed mixture; and
calcining the feed mixture to form calcined coke.

14. The method according to claim 13 wherein calcining the feed mixture includes using a shaft, rotary or rotary hearth, kiln.

15. The method according to claim 13 wherein briquetting the undersized fraction includes using a binder in the amount less than about 15% by weight.

16. The method according to claim 13 further comprising milling or pulverizing the undersized fraction before briquetting the undersized fraction.

17. The method according to claim 6, wherein the milled or pulverized undersized fraction has a particle size as fine as 95% passing a 200 Tyler mesh screen.

18. The method according to claim 1, wherein the organic based binder comprises a water soluble organic based binder.

19. The method according to claim 8, wherein the organic base binder is present in an amount less than 1% by weight of the milled coke.

* * * * *